(12) United States Patent
Suda et al.

(10) Patent No.: US 8,503,284 B2
(45) Date of Patent: *Aug. 6, 2013

(54) PILOT ARRANGEMENT METHOD IN MOBILE RADIO COMMUNICATION SYSTEM AND TRANSMITTER/RECEIVER ADOPTING SAME

(75) Inventors: Kenji Suda, Kawasaki (JP); Hiroyuki Seki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 89 days.

This patent is subject to a terminal disclaimer.

(21) Appl. No.: 12/779,405

(22) Filed: May 13, 2010

(65) Prior Publication Data

US 2010/0220685 A1 Sep. 2, 2010

Related U.S. Application Data

(63) Continuation of application No. 12/688,319, filed on Jan. 15, 2010, which is a continuation of application No. PCT/JP2007/000831, filed on Aug. 2, 2007.

(51) Int. Cl.
| | |
|---|---|
| *H04J 3/00* | (2006.01) |
| *H04W 72/04* | (2009.01) |
| *H04B 7/208* | (2006.01) |
| *H04L 27/28* | (2006.01) |

(52) U.S. Cl.
USPC ........... 370/208; 370/210; 370/281; 370/330; 370/336; 370/345; 375/260; 375/267; 375/295; 455/450

(58) Field of Classification Search
USPC ................ 370/203–207, 208–210, 336, 345, 370/342–343, 490–491; 375/260; 455/450
See application file for complete search history.

(56) References Cited

U.S. PATENT DOCUMENTS

| | | | |
|---|---|---|---|
| 6,385,184 B2 | 5/2002 | Kitade et al. | |
| 7,539,157 B2 | 5/2009 | Ohsuge | |
| 7,583,586 B2 * | 9/2009 | Park et al. | 370/209 |
| 7,652,980 B2 * | 1/2010 | Henriksson et al. | 370/208 |

(Continued)

FOREIGN PATENT DOCUMENTS

| | | |
|---|---|---|
| AU | 2006258593 | 6/2006 |
| AU | 2006258593 | 12/2006 |

(Continued)

OTHER PUBLICATIONS

Korean Intellectual Property Office "Notice of Preliminary Rejection" issued for corresponding Korean Patent Application No. 10-2010-7002004, mailed Feb. 11, 2011. English translation attached.

(Continued)

*Primary Examiner* — Candal Elpenord
(74) *Attorney, Agent, or Firm* — Myers Wolin, LLC (57) ABSTRACT

A pilot arrangement method in a mobile communication system in which a working frequency band is divided into a plurality of predetermined bands, and time division multiplexing is performed, the method comprising, inserting a known pilot symbol into the plurality of predetermined frequency bands at a predetermined reference interval; and inserting to arrange the known pilot symbol into at least one of the plurality of predetermined frequency bands at a smaller interval than the predetermined reference interval, wherein a pattern inserting the known pilot symbol into a at least the one of the plurality of predetermined frequency bands at the smaller interval is changed according to a predetermined pattern.

9 Claims, 13 Drawing Sheets

U.S. PATENT DOCUMENTS

| | | | |
|---|---|---|---|
| 7,778,337 B2* | 8/2010 | Tong et al. | 375/260 |
| 2003/0072254 A1* | 4/2003 | Ma et al. | 370/208 |
| 2004/0151109 A1* | 8/2004 | Batra et al. | 370/208 |
| 2004/0257981 A1* | 12/2004 | Ro et al. | 370/210 |
| 2005/0063298 A1* | 3/2005 | Ling et al. | 370/208 |
| 2005/0068931 A1* | 3/2005 | Cho et al. | 370/345 |
| 2005/0094552 A1* | 5/2005 | Abe et al. | 370/208 |
| 2005/0099939 A1* | 5/2005 | Huh et al. | 370/210 |
| 2005/0286408 A1* | 12/2005 | Jin et al. | 370/208 |
| 2006/0146867 A1 | 7/2006 | Lee et al. | |
| 2007/0053282 A1* | 3/2007 | Tong et al. | 370/208 |
| 2007/0064588 A1 | 3/2007 | Kisoda et al. | |
| 2008/0219144 A1* | 9/2008 | Brehler et al. | 370/203 |
| 2009/0190537 A1 | 7/2009 | Hwang et al. | |
| 2009/0296563 A1 | 12/2009 | Kishiyama et al. | |

FOREIGN PATENT DOCUMENTS

| | | |
|---|---|---|
| EP | 1 898 542 | 3/2008 |
| JP | 11-331071 | 11/1999 |
| JP | 2003-249907 | 9/2003 |
| JP | 2003-348046 | 12/2003 |
| JP | 2005-45564 | 2/2005 |
| JP | 2005-109743 | 4/2005 |
| JP | 2006-510315 | 3/2006 |
| JP | 2007089113 | 4/2007 |
| KR | 10-2007-0051675 | 5/2007 |
| KR | 20070051675 | 5/2007 |
| WO | 2004/082181 | 9/2004 |
| WO | 2005/041515 | 5/2005 |
| WO | 2006/069401 | 6/2006 |
| WO | 2006/134949 | 12/2006 |
| WO | 2007/055551 | 5/2007 |

OTHER PUBLICATIONS

Japanese Patent Office "Notification of Reason for Rejection" issued for corresponding Japanese Patent Application No. 2009-525182, issued Nov. 28, 2011. English translation attached.

The State Intellectual Property Office of Russia "Office Action", issued for corresponding Russian Patent Application No. 2010123397/07(033271), dated Jun. 23, 2011. English translation attached.

State Intellectual Property Office of Russia "Questions, Arguments, Objections, Proposals" issued for corresponding Russian Patent Application No. 2010107458/09(010456), mailed Feb. 4, 2011. English translation attached.

3GPP TR 25.814 V7.0.0; 3rd Generation Partnership Project; Technical Specification Group Radio Access Network; "Physical layer aspects for evolved Universal Terrestrial Radio Access (UTRA)"; (Release 7); Jun. 2006. Relevant Chapter 7.1.1.2.2.

3GPP TS 36.211 V8.7.0; 3rd Generation Partnership Project; Technical Specification Group Radio Access Network; "Evolved Universal Terrestrial Radio Access (E-UTRA); Physical Channels and Modulation"; (Release 8); May 2009.

International Search Report for corresponding International Application No. PCT/JP2007/000831, mailed Oct. 30, 2007.

Office Action issued on Jul. 28, 2011, for corresponding Mexican Patent Application No. 2010001180, with English translation.

Extended European Search Report including the Search Opinion issued by the European Patent Office for corresponding European Patent Application No. 10161330.5, mailed Sep. 29, 2010.

Extended European Search Report including the supplementary European Search Report and Search Opinion issued by the European Patent Office for corresponding International Patent Application No. PCT/JP2007000831, mailed Oct. 1, 2010.

Notice of Preliminary Rejection issued for corresponding Korean Patent Application No. 10-2010-7010432 with English translation mailed Apr. 27, 2012.

Official Australian Office Action issued for corresponding Australian Patent Application No. 2010201966 dated Mar. 28, 2012.

Notice of Preliminary Rejection issued for corresponding Korean Patent Application No. 10-2010-7002004 with English translation mailed Apr. 27, 2012.

Final Office Action issued by the United States Patent and Trademark Office for corresponding U.S. Appl. No. 12/688,319, mailed Sep. 26, 2012.

Notice of Final Rejection issued for corresponding Korean Patent Application No. 10-2010-7002004, mailed Nov. 22, 2012, with English translation.

Notice of Final Rejection issued for corresponding Korean Patent Application No. 10-2010-7010432, mailed Nov. 22, 2012, with English translation.

Office Action issued for corresponding Russian Patent Application No. 2012108757, mailed Feb. 18, 2013, with partial English translation.

First Notification of Office Action issued for corresponding Chinese Patent Application No. 201010184870.0 dated Jul. 20, 2012 with English translation.

Notice of Reconsideration Result issued for corresponding Korean Patent Application No. 10-2010-7002004, mailed on Apr. 18, 2013. English translation included.

* cited by examiner

PILOT ARRANGEMENT METHOD IN MOBILE RADIO COMMUNICATION SYSTEM AND TRANSMITTER/RECEIVER ADOPTING SAME

CROSS-REFERENCE TO RELATED APPLICATIONS

This application is a continuation of U.S. application Ser. No. 12/688,319, filed on Jan. 15, 2010, now pending, which is a continuation of international application PCT/JP2007/000831, filed on Aug. 2, 2007, the contents of which are herein incorporated by reference.

FIELD

The present invention relates to a pilot arrangement method in a mobile radio communication system and a transmitter/receiver adopting the same.

BACKGROUND

On the subject of next generation radio access systems for the third generation mobile communication of mobile radio communication systems, discussions on LTE (Long Term Evolution) is in progress at 3GPP (3rd Generation Partnership Project).

In LTE, it is a precondition that frequency and time scheduling are performed in resource block (RB) or resource unit (RU) units.

Figure 1:
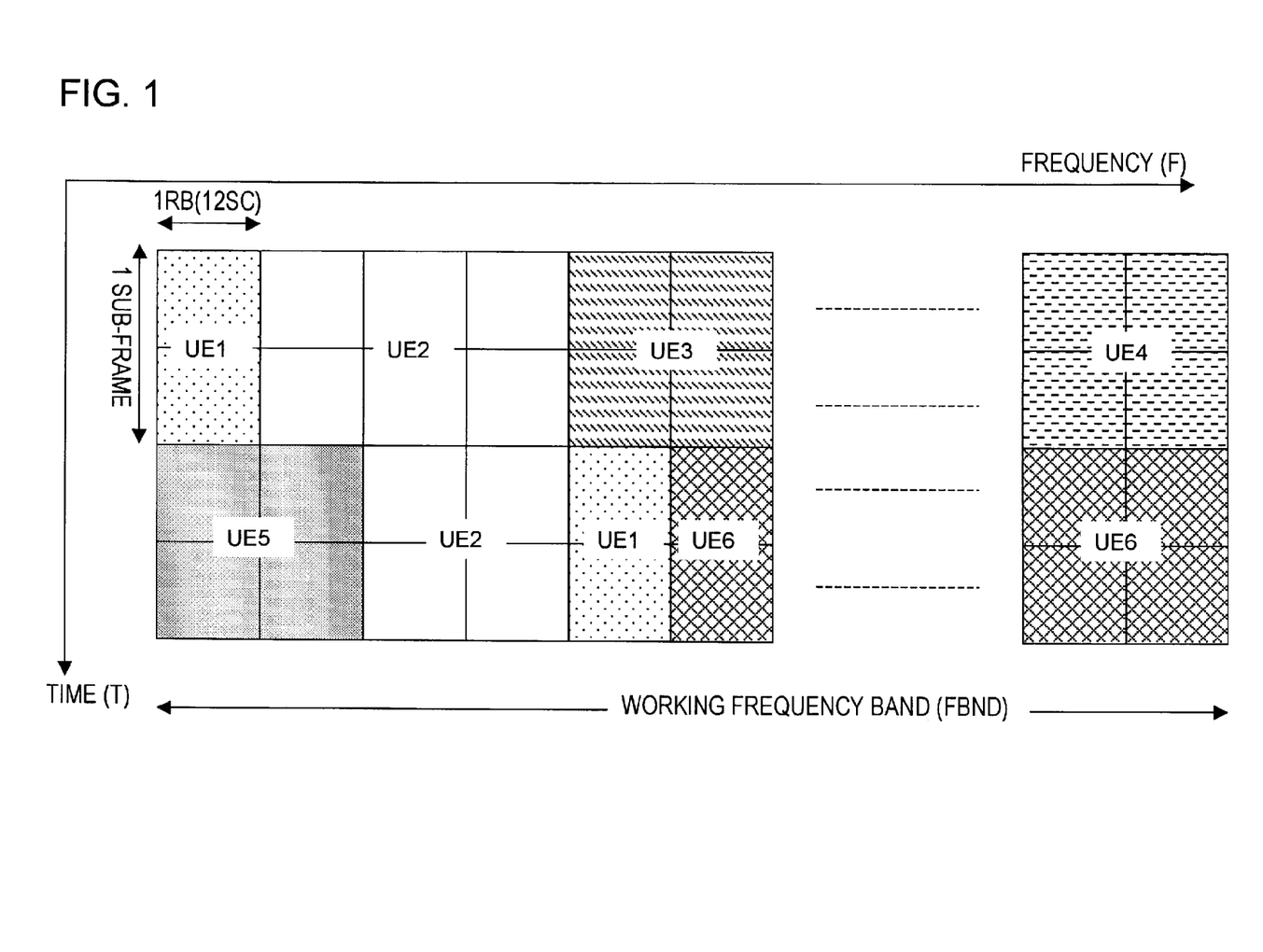
FIG. 1 is a diagram depicting frequency and time scheduling.

FIG. 1 is a diagram depicting this frequency and time scheduling. The working band is divided into resource blocks, and the frequency is allocated to a plurality of user terminals, that is mobile terminals (UE: User Equipment).

The working band is also time-divided into sub-frames in the time axis direction, and frequency in resource block units is switched and allocated to a plurality of mobile terminals (UE).

This scheduling of allocation in sub-frame units in the frequency axis and time axis directions is performed by the base station.

Scheduling is normally performed based on channel quality information (CQI) in resource block (RB) or resource unit (RU) units.

CQI corresponds to signal-to-interference ratio (SIR), and SIR at the mobile terminal side is normally measured by monitoring the level of a common pilot, which is common to users, from the base station.

In the above mentioned LTE, common pilot channels are arranged in the frequency direction with intervals downlink (Non-patent Document 1).

Figure 2:
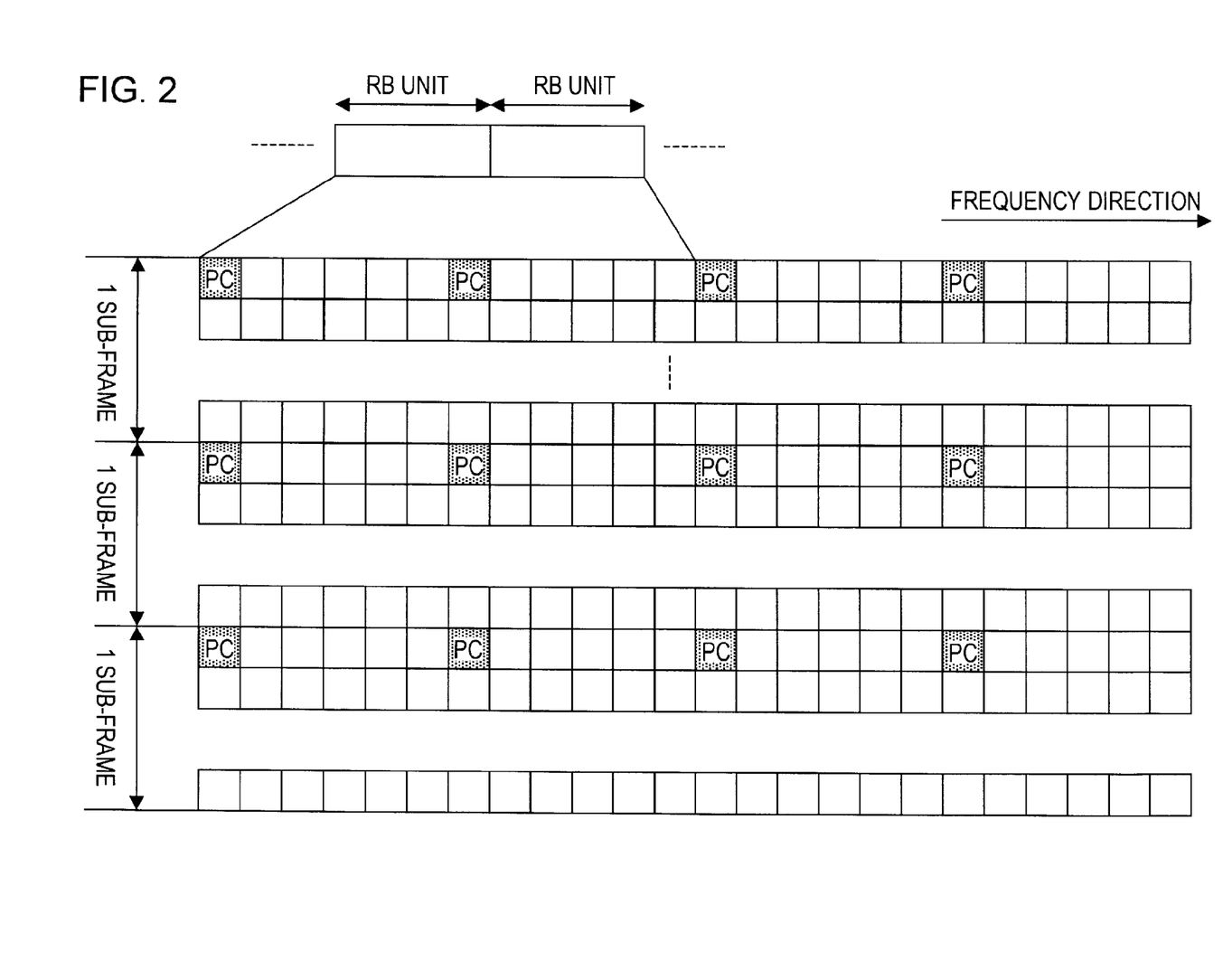
FIG. 2 depicts an example of arranging common pilot channels with an interval in the frequency direction, which is described in Non-patent Document 1.

FIG. 2 is a diagram depicting the example of arranging common pilot channels (PC) in the frequency direction with intervals, which is described in Non-patent Document 1.

Patent Document 1 proposes a structure of attaching common pilot symbols and a known series in each slot in order to enhance the SIR measurement accuracy, and a communication device at the reception side estimates the SIR using common pilot symbols and a known series in the received slot.

In the above mentioned mode shown in LTE, the pilot arrangement interval increases if the insertion interval of the pilot channels is very large, if the number of transmission antennas is high, or if the number of multiplexed users is high. Because of this, the number of common pilots to be arranged in a resource block and resource unit in specific units decreases.

Figure 3:
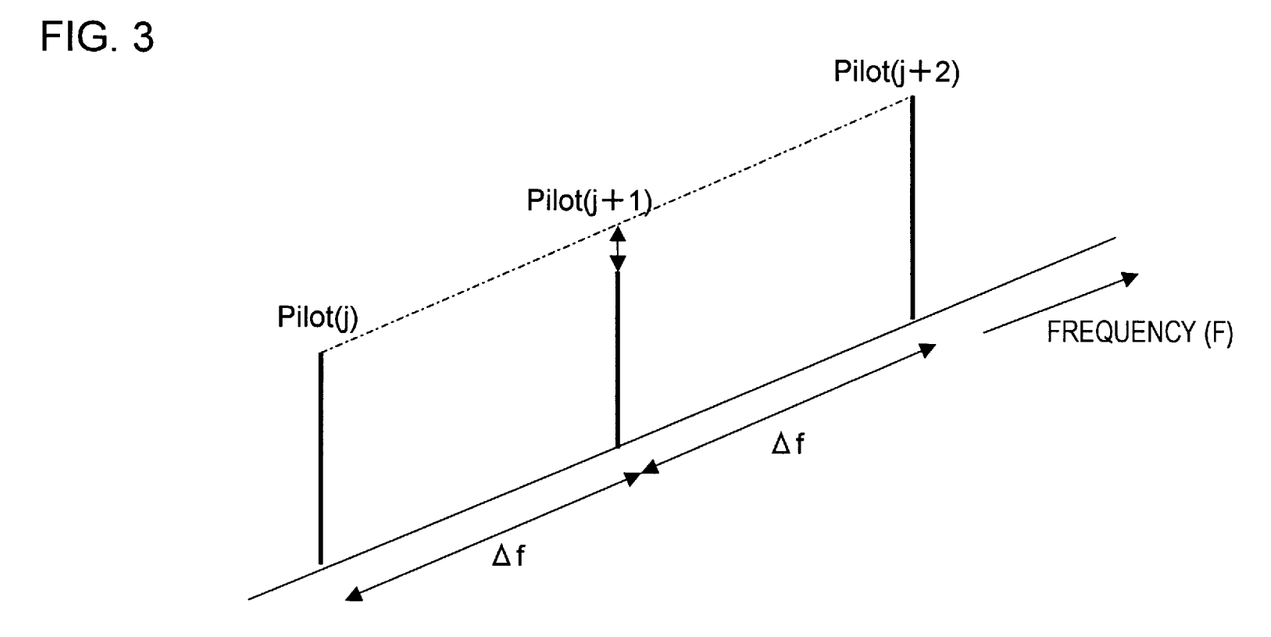
FIG. 3 is a conceptual diagram depicting measurement of I (interval power) when SIR, generally given by Expression 1, is measured.

Measurement of I (interference power) to measure SIR is normally expressed by Expression 1, and FIG. 3 shows a conceptual diagram of the measurement. Expression 1 determines the difference between the average value of the pilot levels before and after and the position of the pilot channel as the interference power.

$$I_{f+1} = \frac{2}{3}\sum \left[ \left| \frac{p_j + p_{j+2}}{2} - p_{j+1} \right|^2 \right] \quad \text{Expression 1}$$

DISCLOSURE OF THE INVENTION

Problems to be Solved by the Invention

In the above Expression 1, Pj is a pilot after cancelling a pilot pattern based on the j-th subcarrier, as shown in FIG. 3.
Non-patent Document 1: 3GPP TR 25.814 v7.0.0 (7.1.1.2.2)
Patent Document 1: Japanese Laid-Open Patent Publication No. 2003-348046

If the arrangement interval of the pilot channels is large, that is if the pilot frequency interval to be used for measurement increases, an estimated value of I (interference power) increases because of the frequency selectivity between subcarriers, especially in an environment where delay dispersion is large.

Because of this, the accuracy of SIR estimation in a resource block RB or resource unit RU units deteriorates.

Therefore if the interval of the pilot channels is large, scheduling may be affected and throughput may drop, because accuracy of SIR estimation deteriorates and the CQI accuracy also deteriorates since the CQI corresponds to SIR in scheduling.

The above mentioned Patent Document 1 describes improving SIR estimation accuracy using pilots and known series, but does not mention the interval of pilot channels.

With the foregoing in view, it is an object of the present invention to provide a pilot arrangement method in a mobile radio communication system that solves the problem that occurs when the interval of pilot channels is large, and a transmitter/receiver adopting the same.

Means for Solving the Problem

In order to solve the above problem, the present invention provides a pilot arrangement method in a mobile communication system by which a working frequency band is divided into a plurality of predetermined bands, and time division multiplexing is performed, characterized in that a known pilot symbol is inserted into the plurality of predetermined frequency bands at a predetermined reference interval, and the known pilot symbol is inserted and arranged into at least one of the plurality of predetermined frequency bands at a smaller interval than the predetermined reference interval.

Moreover, the pilot symbols can be inserted and arranged at a smaller interval than the predetermined reference interval into at least one frequency band out of the plurality of predetermined frequency bands, based on the signal-to-interference ratio measurement information at the reception side.

Because of this characteristic, opportunities to measure SIR using known pilots increase, and the frequency interval decreases, therefore I (interference power) estimation accuracy improves, and as a result the problem of performing scheduling based on CQI corresponding to SIR at the transmission side, and poor CQI accuracy which affects and deteriorates throughput, can be prevented.

DESCRIPTION OF EMBODIMENTS

Embodiments of the present invention will now be described with reference to the drawings.

Figure 4:
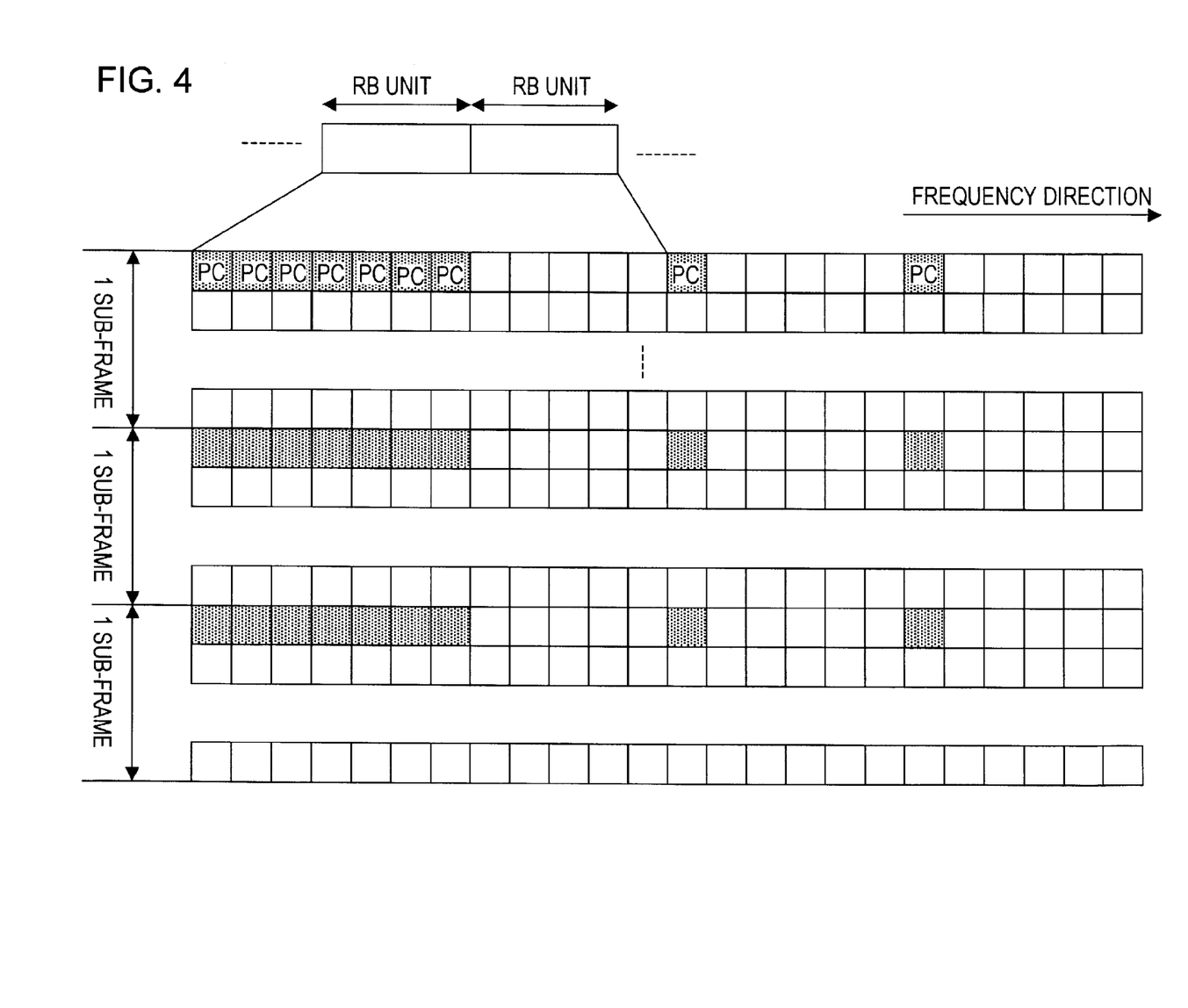
FIG. 4 depicts a first arrangement example of pilot channels according to the present invention.

FIG. 4 is a first arrangement example of a pilot channel according to the present invention.

When pilot channels (PC) are arranged with a predetermined reference interval, such as an interval of six subcarriers (SC) (six frequency bands of a plurality of predetermined bands generated by dividing a working frequency) according to a standard, the pilot channels are densely arranged (e.g. continuously arranged) in a predetermined frequency area at a smaller interval than the normal arrangement interval, according to the present invention, as depicted in FIG. 2.

In other words, according to the first embodiment depicted in FIG. 4, pilot channels are arranged continuously after the first resource block RB of each sub-frame.

Figure 5:
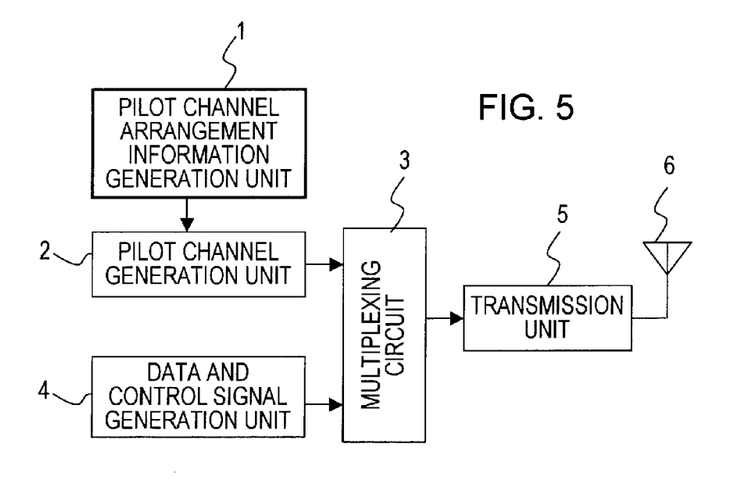
FIG. 5 is a diagram depicting a configuration of a transmitter of a base station, which is a transmission side device corresponding to the embodiment in FIG. 4.
Figure 6:
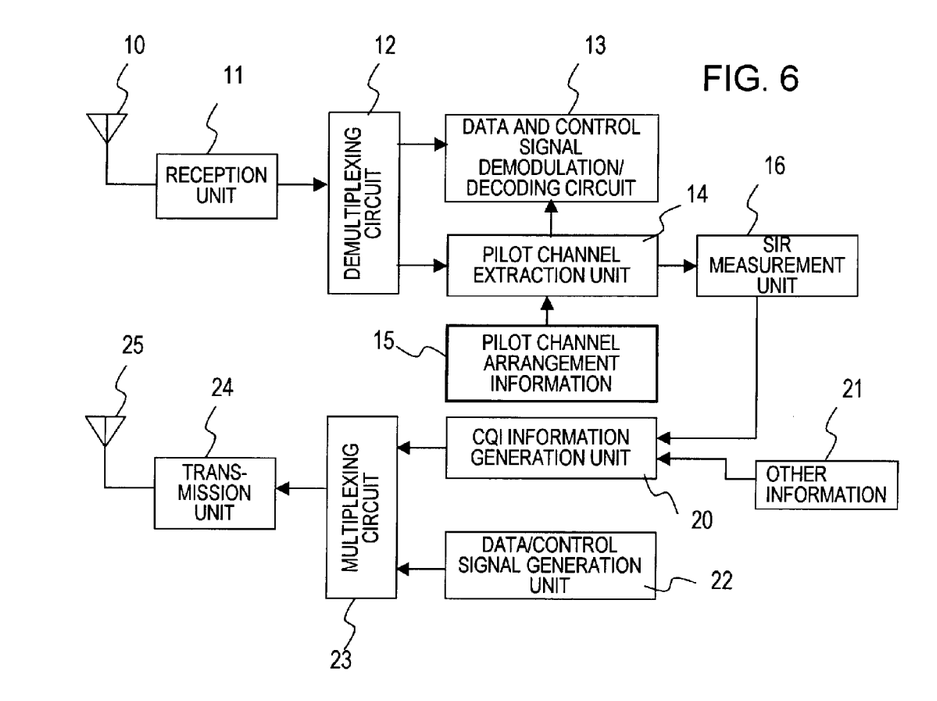
FIG. 6 is a diagram depicting a configuration example of a transmitter/receiver at a mobile terminal side corresponding to the transmitter in FIG. 5.

FIG. 5 depicts a configuration example of a transmitter of a base station, which is a transmission side communication device corresponding to the embodiment in FIG. 4, and FIG. 6 depicts a configuration example of a transmitter/receiver of a mobile terminal, which is a corresponding reception side communication device.

In the transmission side depicted in FIG. 5, a pilot signal from a pilot channel generator 2, and data and a control signal from a data and control signal generator 4 are channel-multiplexed by a multiplexing circuit 3, and modulated, amplified and transmitted via a transmission antenna 6 by a transmission unit 5.

In the transmission device shown in FIG. 5, the pilot channel generator 2 acquires position information for arranging the pilot channels from a pilot channel arrangement information generation unit 1, and outputs a common pilot signal to the multiplexing circuit 3 at a timing of a corresponding position.

FIG. 6 is a block diagram depicting a configuration of a transmitter/receiver at a pilot reception side, that is a mobile terminal side, corresponding to FIG. 5.

The pilot signal and the signal in which data and control signal are multiplexed are received by an antenna 10. The reception signal is demodulated by the reception unit 11, branched by a demultiplexing circuit 12, and input to a data and control signal demodulation/decoding circuit 13 and pilot channel extraction unit 14.

The pilot channel extraction unit 14 controls pilot detection timing in the pilot channel extraction unit 14 based on common pilot channel arrangement information 15, which is notified by the transmission side in advance or which is known.

Information on the common pilot channel arrangement information 15 from the transmission side is either already known or can be notified by a control signal before changing scheduling or by any arbitrary method.

The pilot channel extraction portion 14 detects a common pilot symbol at a pilot detection timing to be controlled, and outputs the level to an SIR measurement unit 16.

The pilot channel extraction unit 14 notifies a pilot detection timing to a data and control signal demodulation/decoding circuit 13 so as to provide reference of data and control signal reception timing in the control signal demodulation/decoding circuit 13.

The SIR measurement unit 16 measures SIR, which is a signal-to-interference ratio, based on the level for each receive pilot symbol notified from the pilot channel extraction unit 14.

The measured SIR is sent to a CQI information generation unit 20. Other information 21 related to the line state is also sent to the CQI information generation unit 20 if necessary.

The CQI information generation unit 20 creates CQI information corresponding to the SIR value by a conventional processing method based on the measured SIR sent from the SIR measurement unit 16, and other information 21 related to the line state.

The multiplexing circuit 23 multiplexes the CQI information created like this and a data and control signal from a data/control signal generation unit 22, and transmits it to a transmission unit 24.

The transmission unit 24 modulates and amplifies the multiplexed signal and transmits it from an antenna 25 to the base station side.

The base station side estimates SIR based on the CQI information that is sent from the transmitter/receiver at the mobile terminal side. And based on the estimated SIR, the pilot channel arrangement information generation unit 1 generates position information for arranging the pilot channels using a conventional method.

The new common pilot channel arrangement information that is generated like this is set based on the reception state of the reception side, so the SIR estimation accuracy which is based on the common pilot channel can be enhanced.

Figure 7:
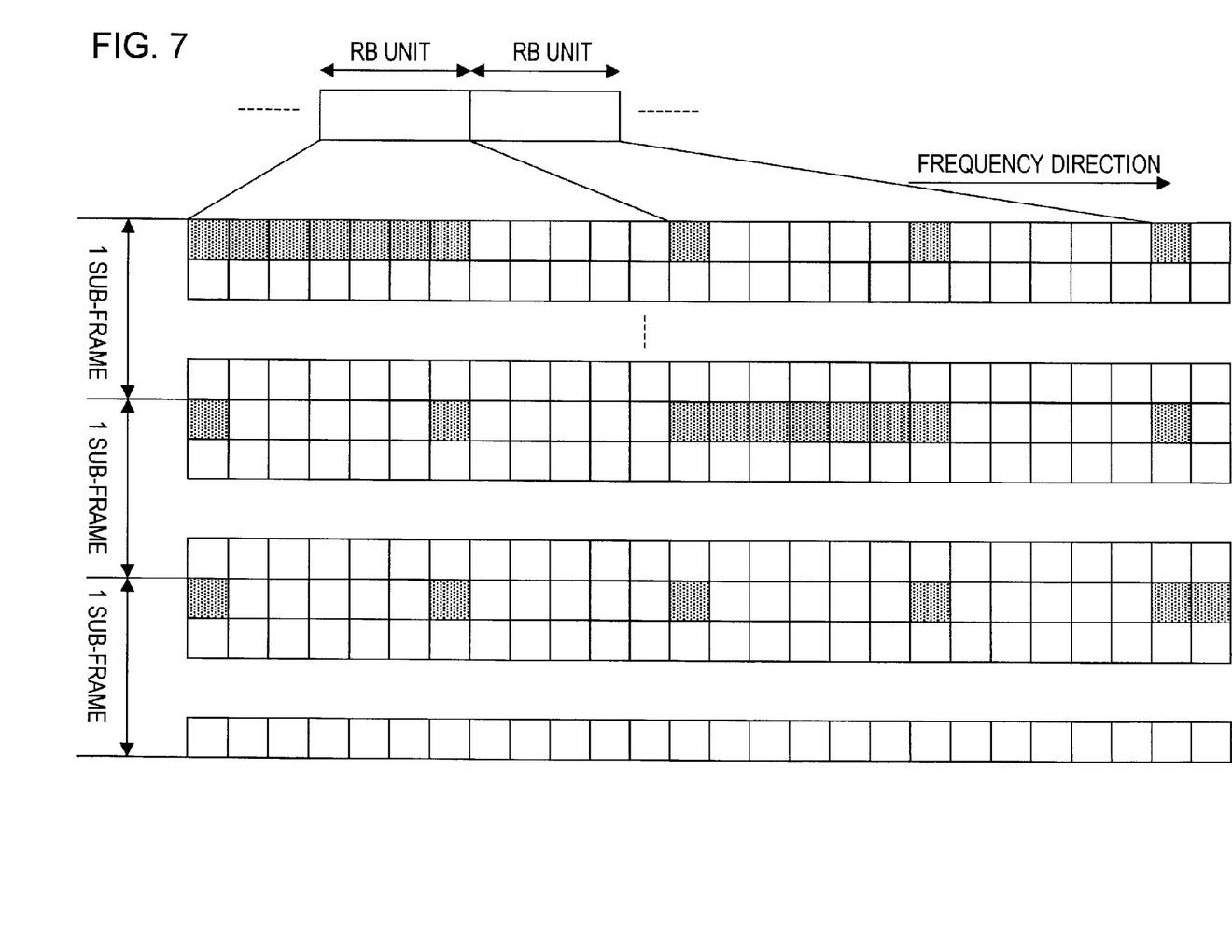
FIG. 7 is a diagram depicting a pilot channel arrangement according to a second embodiment.

FIG. 7 is a diagram depicting a pilot channel arrangement according to a second embodiment. In the first embodiment in FIG. 4, a position from which the pilots are continuously arranged is the first position of each sub-frame. On the other hand, in the configuration of the example depicted in FIG. 7, the position from which pilots are continuously arranged at a predetermined time interval is changed.

Figure 8:
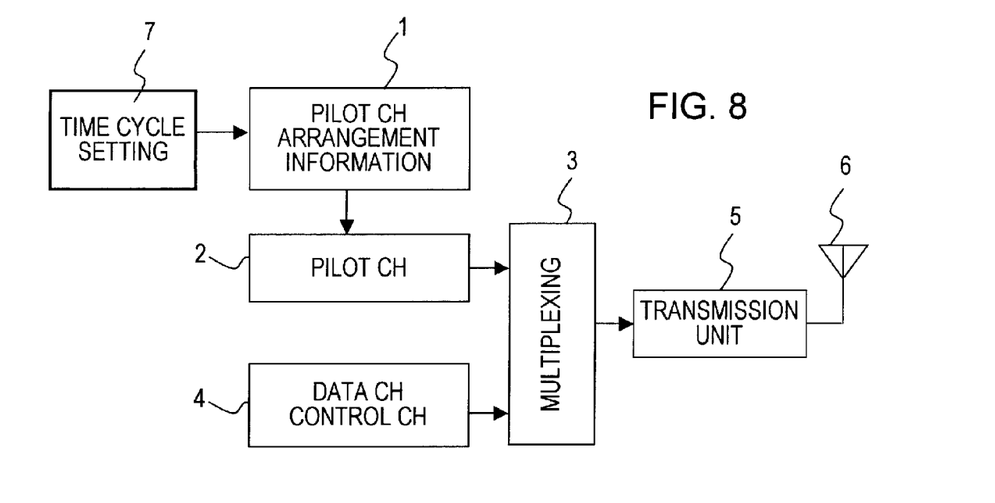
FIG. 8 is a diagram depicting a configuration of a transmitter at a transmission side corresponding to the embodiment in FIG. 7.

For this, a transmitter at the transmission side shown in FIG. 8, which corresponds to the embodiment in FIG. 7, has a function to set a time cycle for the pilot arrangement information generation unit 1 using a time cycle setting unit 7. Therefore a pilot arrangement generation unit 1 changes the pilot channel arrangement at the time cycle which is set, and so as to control the pilot generation timing of the pilot channel generator 2.

The other configuration functions of the transmitter at the transmission side is the same as the configuration in FIG. 5 described above.

Figure 9:
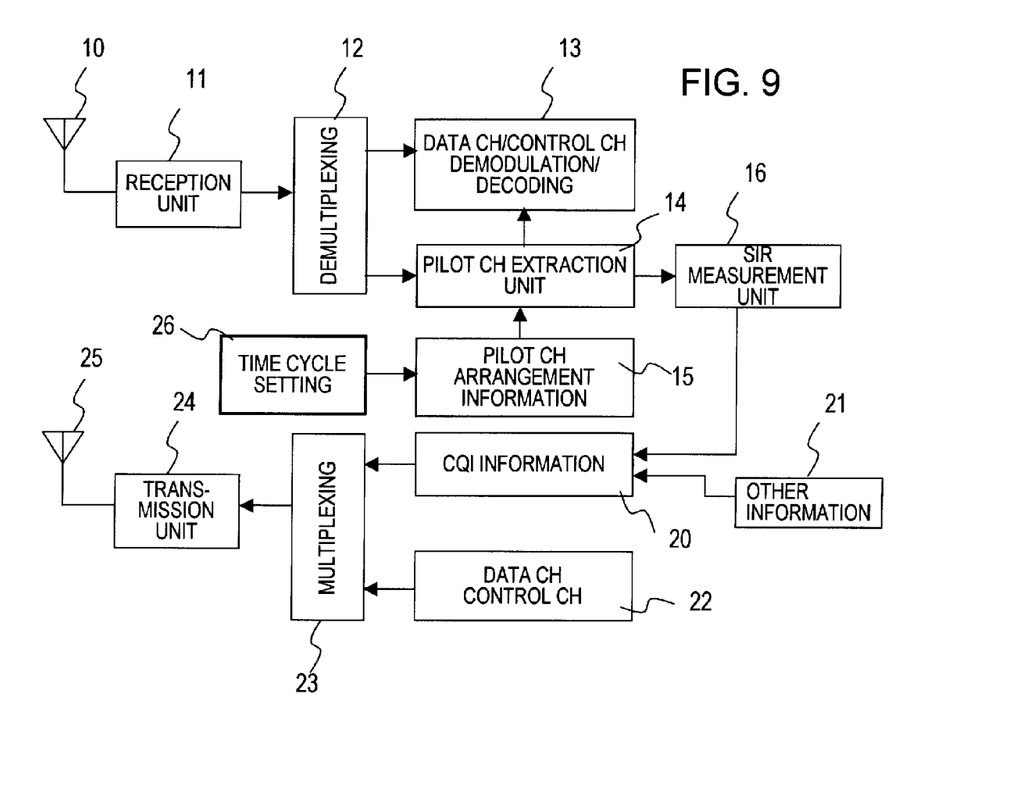
FIG. 9 is a diagram depicting a configuration of a transmitter/receiver at the pilot channel reception side, that is the mobile terminal side, corresponding to FIG. 7.

FIG. 9 depicts the configuration of a transmitter/receiver at the pilot reception side, that is at the mobile terminal side, corresponding to FIG. 7.

The transmitter/receiver at the reception side shown in FIG. 9 also has a time cycle setting unit 26. This time cycle is already known or has been notified from the transmission side in advance, just like the previous embodiment. Therefore a pilot channel arrangement information generation unit 15 of the reception side can create pilot channel arrangement information synchronizing with the transmission side.

The pilot channel extraction timing in the pilot channel extraction unit 14 is controlled at the pilot channel positions created by the pilot channel arrangement information generation unit 15. The other configuration and operations are the same as those described with reference to FIG. 6.

Figure 10:
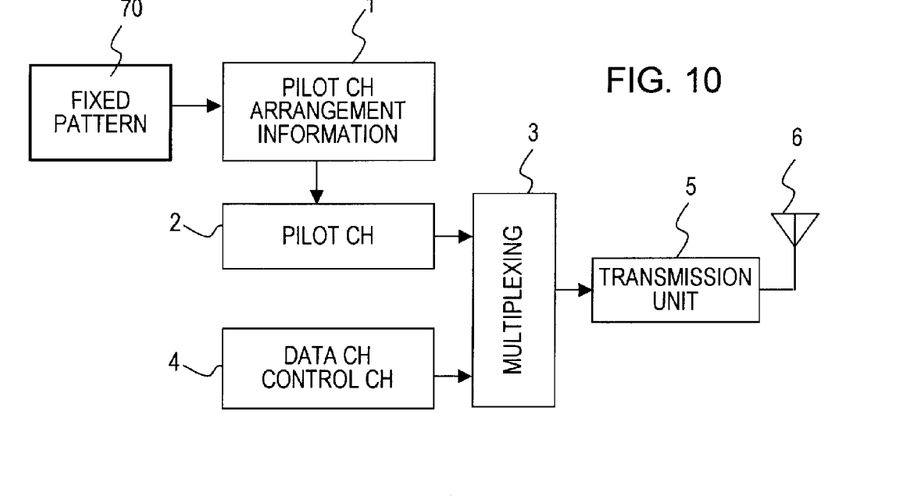
FIG. 10 is a diagram depicting a configuration of a transmitter at the transmission side according to the third embodiment of the present invention.
Figure 11:
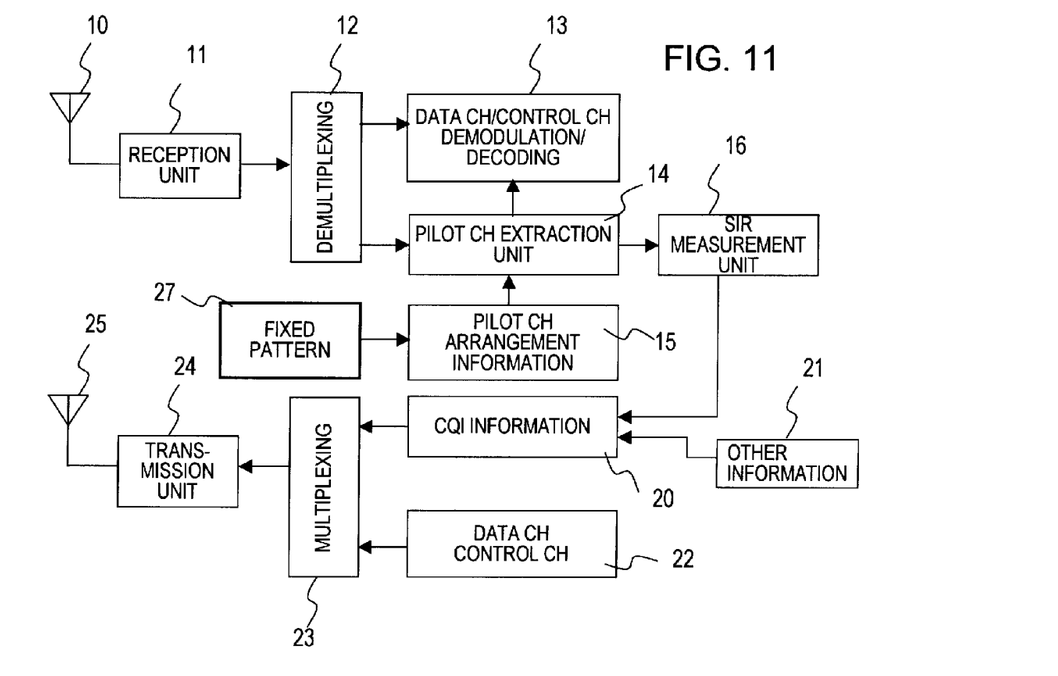
FIG. 11 is a diagram depicting a configuration of a transmitter/receiver at the reception side corresponding to the transmitter at the transmission side in FIG. 10.

FIG. 10 is a diagram depicting a configuration of a transmitter at the transmission side according to the third embodiment of the present invention, and FIG. 11 is a diagram depicting a configuration of a transmitter/receiver at the reception side corresponding to the transmitter of FIG. 10.

In the transmitter at the transmission side in FIG. 10, a fixed pattern generation unit 70 is disposed at the transmission side so that a fixed timing is sent to a pilot channel information generation unit 1 to control the pilot channel arrangement positions.

As FIG. 11 depicts, the reception side has a corresponding fixed pattern generation unit 27 to control the pilot channel arrangement information generation unit 15.

At least for the fixed pattern, a fixed pattern to densely arrange pilots from the reference pilot channel arrangement position, that is specified by a standard, is set.

Figure 12:
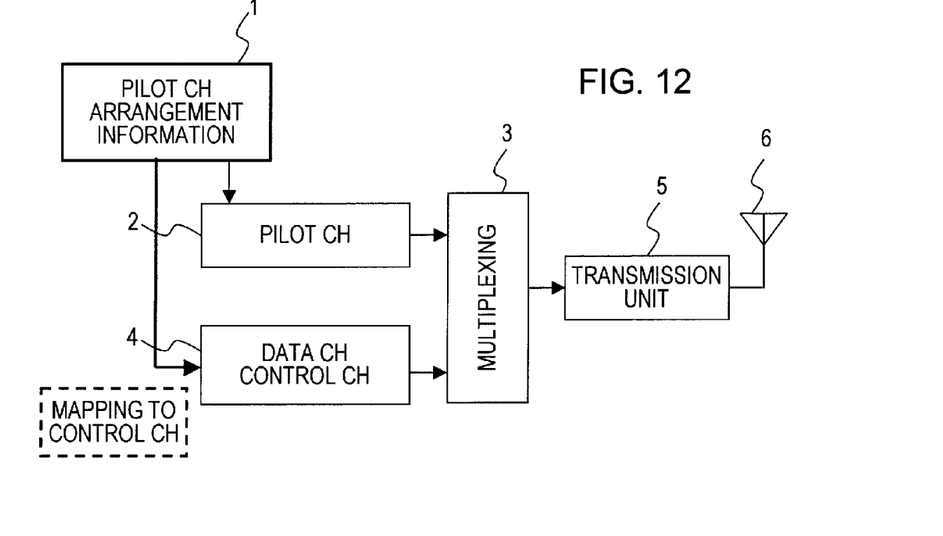
FIG. 12 is a diagram depicting a configuration of a transmitter at the transmission side according to the fourth embodiment of the present invention.
Figure 13:
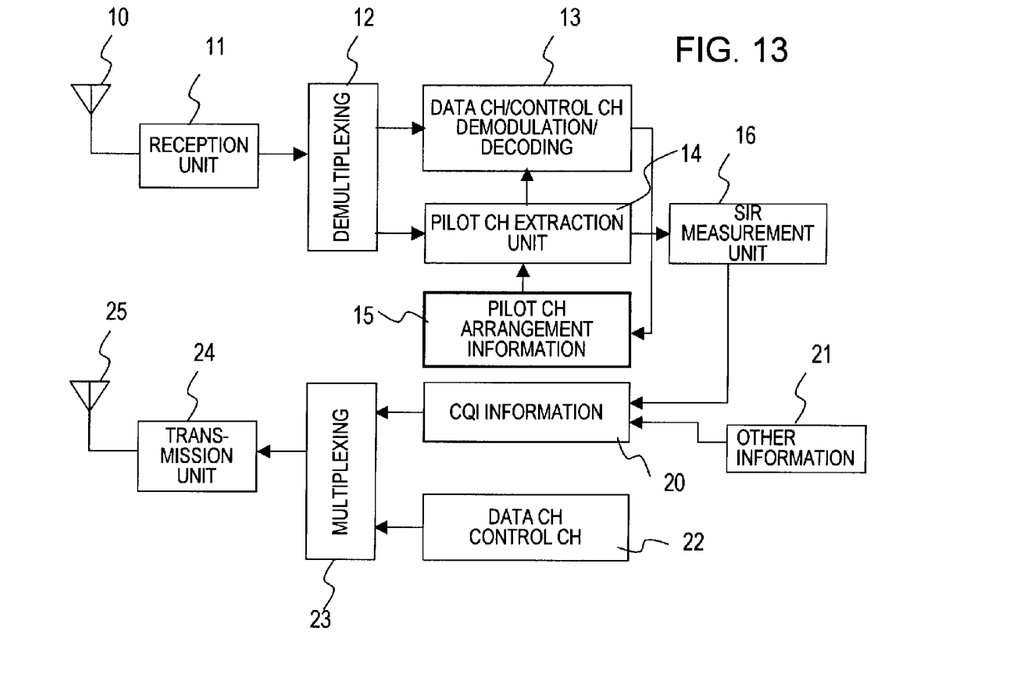
FIG. 13 is a diagram depicting a configuration of a transmitter/receiver at the reception side corresponding to the transmitter at the transmission side in FIG. 12.

FIG. 12 is a diagram depicting a configuration of a transmitter at the transmission side according to the fourth embodiment of the present invention, and FIG. 13 is a diagram depicting a configuration of a transmitter/receiver at the reception side corresponding to the transmitter of FIG. 12.

In the configuration of the fourth embodiment, information on the pilot arrangement positions generated by a pilot channel arrangement information generation unit 1 is embedded in a control signal channel and transmitted to the reception side.

Therefore as FIG. 13 depicts, the reception side device extracts the pilot channel arrangement information inserted in the control channel, that is demodulated/decoded by a data and control signal demodulation/decoding circuit 13, using a pilot channel arrangement information generation unit 15.

The extraction timing in a pilot channel extraction unit 14 is generated based on the extracted pilot channel arrangement information, which is the same as the previous embodiment.

According to the fourth embodiment, it is unnecessary to notify the pilot arrangement information to the reception side in advance.

Figure 14:
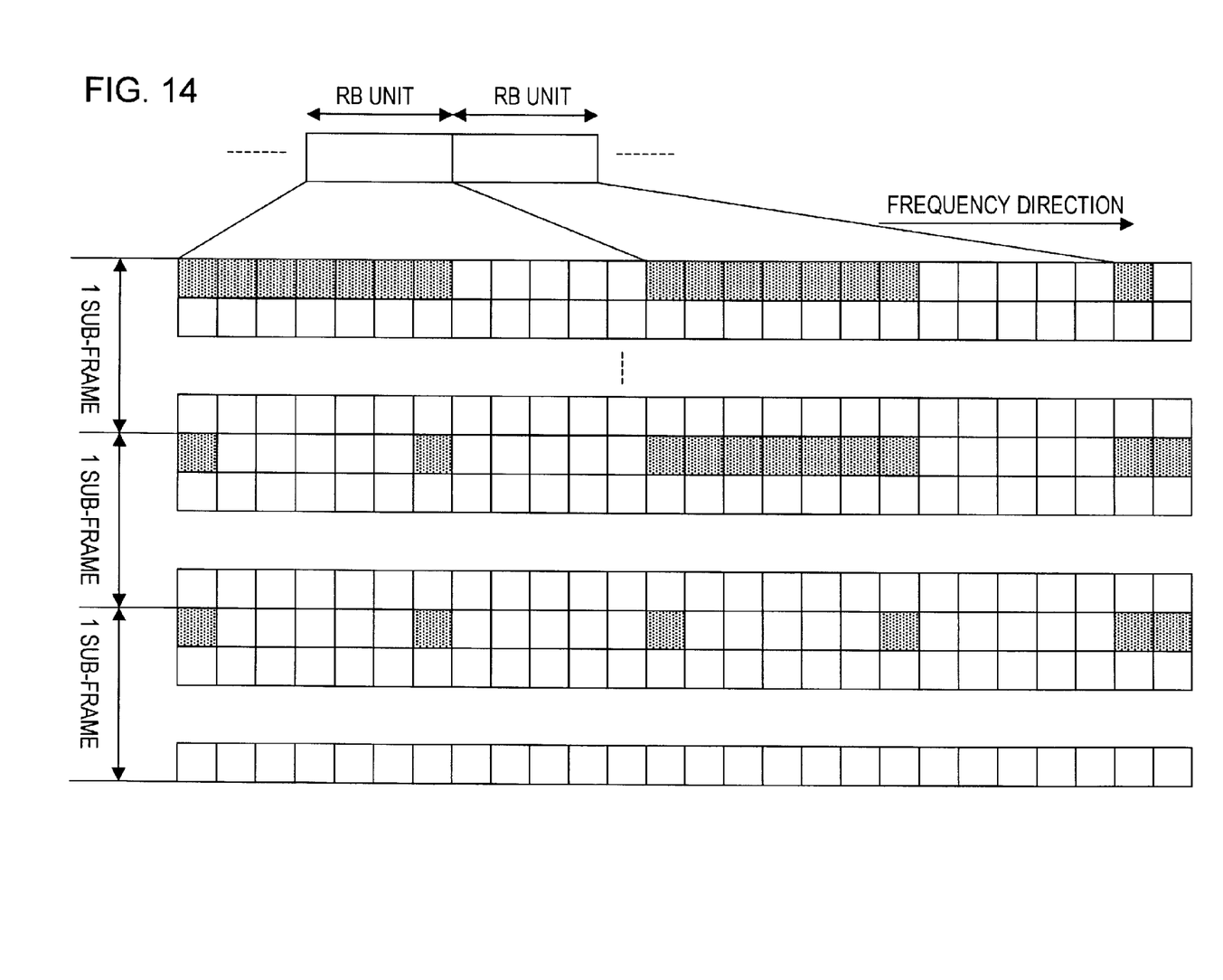
FIG. 14 is a diagram depicting a pilot channel arrangement according to the fifth embodiment of the present invention.

FIG. 14 is a diagram depicting a pilot channel arrangement according to the fifth embodiment of the present invention.

In the configuration example of this embodiment, a continuous pilot channel arrangement is disposed adaptively in a plurality of locations.

Figure 15:
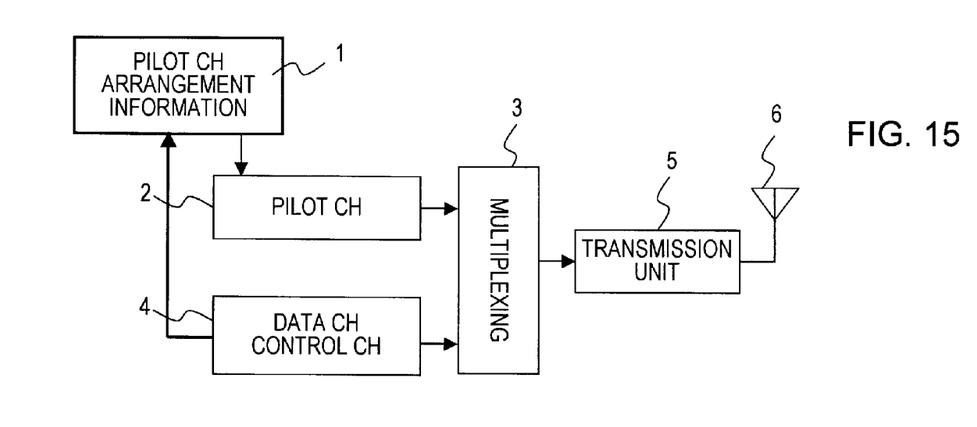
FIG. 15 is a diagram depicting a configuration example for limiting the number of common pilot channels to densely insert depending on the information volume to be transmitted by such as a control channel (communication rate)
Figure 16:
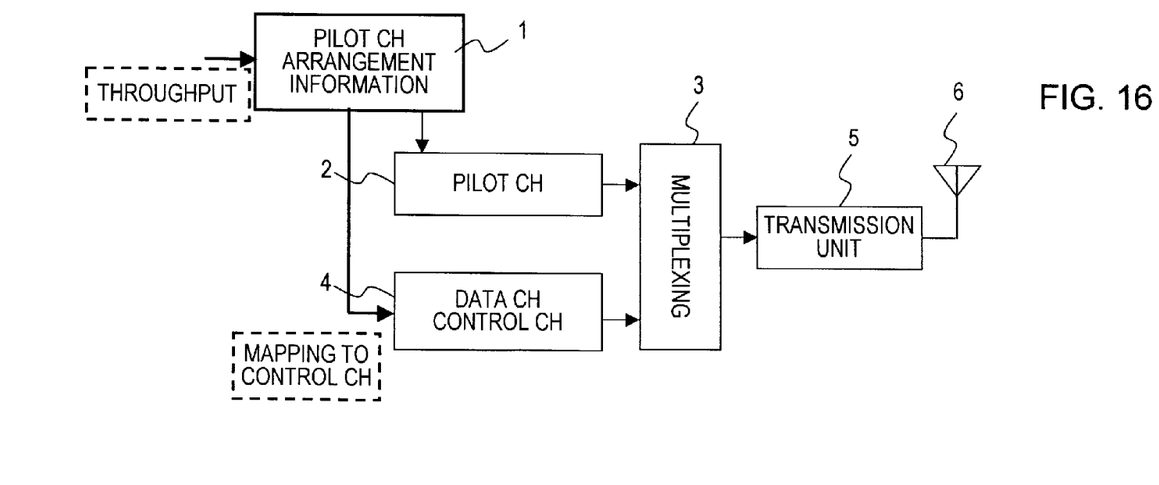
FIG. 16 is a diagram depicting an example of limiting the number of common pilot channels to be densely inserted depending on the information volume to be transmitted by such as a control channel (communication rate)
Figure 17:
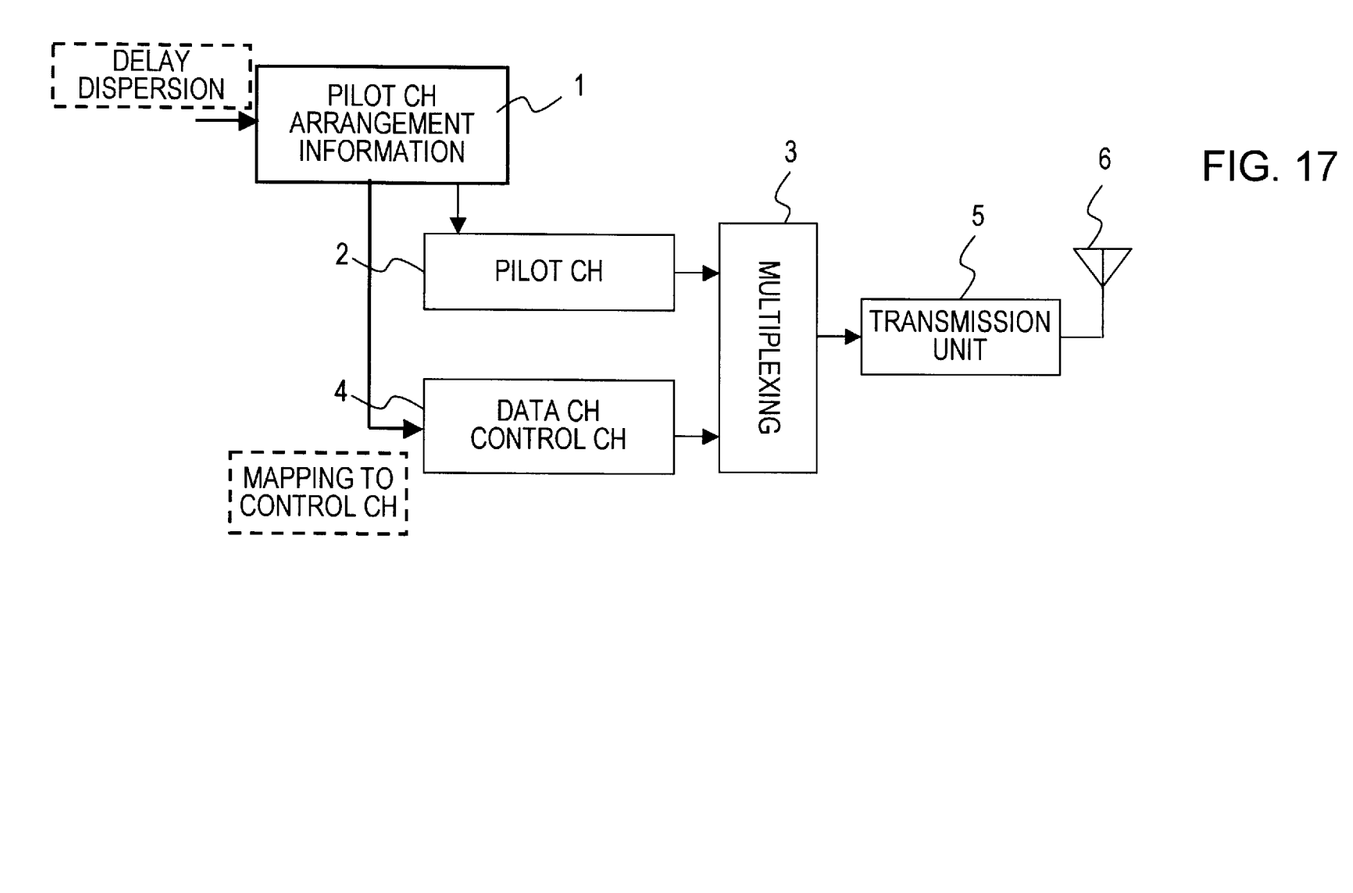
FIG. 17 is a diagram depicting an example of controlling the arrangement of common pilot channels according to the state of delay dispersion.

FIG. 15, FIG. 16 and FIG. 17 are possible configuration examples to be a reference to dispose continuous pilot channel arrangement adaptively in a plurality of locations.

In other words, FIG. 15 is a configuration example for limiting the number of pilots to be densely inserted depending on the information volume to be transmitted of such as a data channel (communication rate) in a transmitter at the transmission side.

If priority is assigned to the transmission of the data channel, the state of the data signal which is transmitted by a data and control signal generator 4 is notified to a pilot channel arrangement information generation unit 1. Because of this, the pilot channel arrangement information generation unit 1 judges the communication rate, and generates arrangement information with which pilot signals can be densely (continuously) inserted. A pilot channel generation unit 2 transmits a pilot to a multiplexing circuit 3 at a pilot insertion timing based on the pilot arrangement information.

Subsequent processing in FIG. 15 is the same as the previous embodiment.

FIG. 16 is a diagram depicting an example of limiting the number of pilots to be densely inserted depending on the information volume to be transmitted by such as a data channel(communication rate) in the transmitter at the transmission side.

This is an example of controlling the pilot arrangement depending on the state of throughput. In other words, in the transmission side device, cell and sector throughputs are monitored using a device, which is not illustrated. During this monitoring, if the corresponding throughput deteriorates and becomes smaller than a threshold, the pilot channel arrangement information generation unit 1 is controlled to make the pilot arrangement dense. The pilot channel arrangement information generation unit 1 inserts the pilot channel arrangement information in which the pilot arrangement is made to be dense, into the control channel, and transmits it to the reception side, just like the embodiment depicted in FIG. 12. Thereby the continuous pilot channel arrangement can be adaptively changed.

FIG. 17 is an example of controlling pilot signal arrangement according to the state of delay dispersion. In other words, in the transmission side device, delay dispersion is monitored using a device, which is not illustrated. During this monitoring, if delay dispersion exceeds a threshold, estimation accuracy for the pilot arrangement positions deteriorates, so the pilot channel arrangement information generation unit 1 is controlled to make the pilot arrangement dense. The pilot channel arrangement information generation unit 1 also inserts the pilot channel arrangement information in which the pilot arrangement is made dense, into the control channel, and transmits it to the reception side, just like the embodiment shown in FIG. 16.

Figure 18:
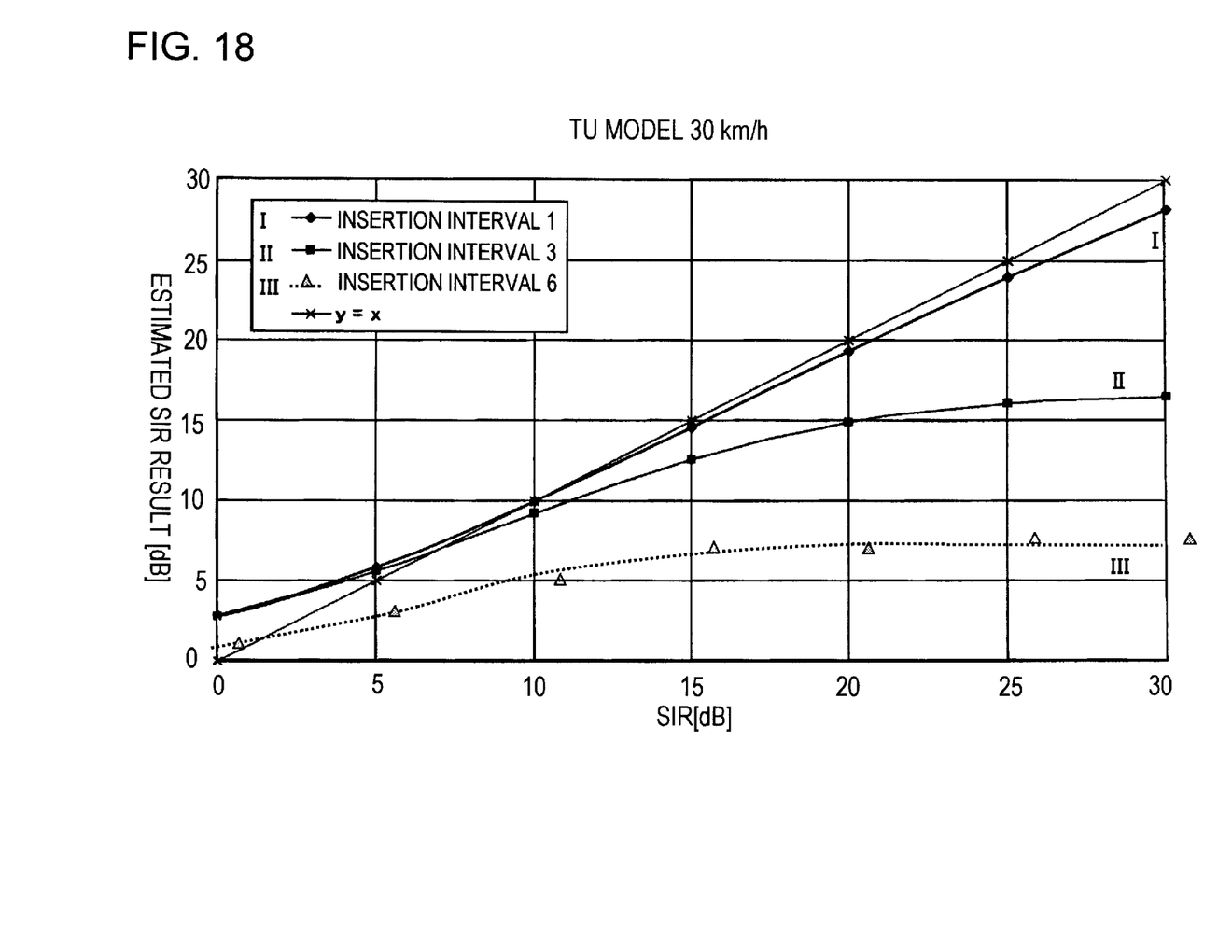
FIG. 18 is a graph depicting the effect of the present invention.

FIG. 18 is a graph depicting the effect of the present invention. By the present invention, the pilot channels are inserted continuously into the reference insertion positions (reference positions determined by a standard) so that arrangement of the pilot channels become dense. Thereby as FIG. 18 depicts, deterioration of estimated SIR decreases as the pilot insertion interval decreases (that is, as the pilot insertion becomes more dense), even if deterioration of SIR increases.

In FIG. 18, I is the case when the insertion interval is 1, II is the case when the insertion interval is 3, and III is the case when the insertion interval is 6, so deterioration of the estimated SIR increases as the insertion interval increases. In other words, according to the present invention, the drop in accuracy of interference power can be suppressed even more as the pilot signal insertion interval decreases.

What is claimed is:

1. A pilot arrangement method for inserting a pilot symbol into predetermined bands at a predetermined reference frequency interval, in a mobile communication system in which a working frequency band is divided into a plurality of predetermined bands, and time division multiplexing is performed, the method comprising:
    inserting the pilot symbol into at least one of the plurality of predetermined frequency bands at a smaller frequency interval than the predetermined reference frequency interval; and
    changing according to a predetermined pattern, the at least one of the plurality of predetermined frequency bands in which the pilot symbol is inserted at the smaller frequency interval.

2. The pilot arrangement method according to claim 1, wherein the insertion of the pilot symbol at the smaller interval than the predetermined reference frequency interval into at least one frequency band out of the plurality of predetermined frequency bands is performed, based on a signal-to-interference ratio measurement information at the a reception side.

3. The pilot arrangement method according to claim 1, wherein the at least one frequency band in which the pilot symbol is inserted at the smaller frequency interval than the predetermined reference frequency interval is notified through a control channel to a reception side.

4. The pilot arrangement method according to claim 2, wherein a frequency band in which the pilot symbol is inserted at the smaller frequency interval than the predetermined reference frequency interval is notified through a control channel to a reception side.

5. The pilot arrangement method according to claim 1, wherein a number of frequency bands in each of which the pilot symbol is inserted at the smaller frequency interval than the predetermined reference frequency interval is determined based on a transmission rate, a cell throughput or delay dispersion.

6. A base station device inserting a pilot symbol into predetermined frequency bands at a predetermined reference interval, in a mobile communication system in which a working frequency band is divided into a plurality of predetermined bands and time division multiplexing is performed, comprising: an arrangement information generation unit to generate pilot arrangement information for inserting and arranging a pilot symbol into the plurality of predetermined frequency bands; a pilot channel generation unit to output the pilot symbol at a timing based on the pilot arrangement information that is output from the pilot arrangement information generation unit;
    a data and control channel generation unit to generate data and control channels; a multiplexing circuit to multiplex the pilot symbol that is output from the pilot channel generation unit, and the data and the control channels that are output from the data and control channel generation unit; and a transmission unit to multiplex the output of the multiplexing circuit in frequency and time and to generate a transmission output, wherein the arrangement information generation unit inserts the pilot symbol at a smaller frequency interval than the predetermined reference frequency interval into at least one frequency band out of the plurality of predetermined frequency bands, and wherein the arrangement information generation unit changes according to a predetermined pattern, a frequency band in which the pilot symbol is inserted at the smaller frequency interval than the predetermined reference frequency interval.

7. The base station device according to claim 6, wherein the arrangement information generation unit generates arrangement information for inserting the pilot symbol at the smaller frequency interval than the predetermined reference frequency interval into the at least one frequency band out of the plurality of predetermined frequency bands based on signal-to-interference ratio measurement information in a mobile terminal at a reception side.

8. A mobile communication system in which a working frequency band is divided into a plurality of predetermined bands, and time division multiplexing is performed, the mobile communication system comprising: a base station to insert a pilot symbol into at least one of a plurality of predetermined frequency bands at a smaller frequency interval than the predetermined reference frequency interval, wherein the base station changes according to a predetermined pattern the at least the one of the plurality of predetermined frequency bands at the smaller frequency interval into which the pilot symbol is inserted; and a mobile terminal to receive signals transmitted from the base station and to extract and detect the pilot symbol from the received signals according to pilot channel arrangement information.

9. A mobile terminal communicating with a base station in the mobile communication system, the mobile terminal comprising: a receiving unit to receive signals transmitted from the base station; and a pilot extracting unit to extract and detect from the received signals, a pilot symbol, which is inserted at the base station, into at least one of a plurality of predetermined frequency bands at a smaller frequency interval than a predetermined reference frequency interval, wherein the at least the one of the plurality of predetermined frequency bands in which the pilot symbol is inserted at the smaller frequency interval than the predetermined reference frequency interval is changed according to a predetermined pattern.

* * * * *